April 7, 1925.
E. L. KING
1,532,501
DIRECTION INDICATOR FOR MOTOR VEHICLES
Filed Feb. 18, 1924
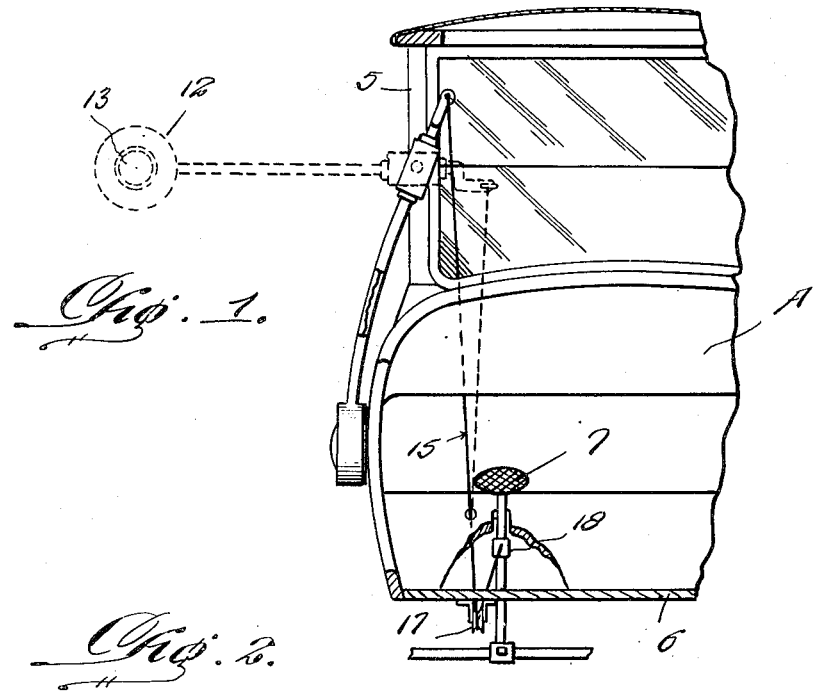
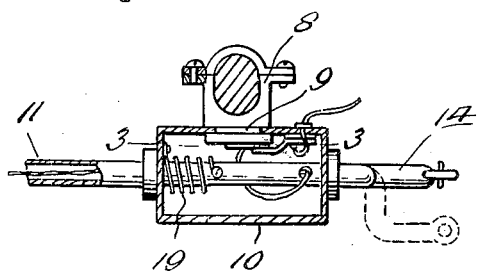
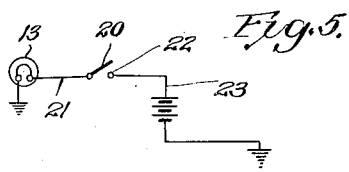
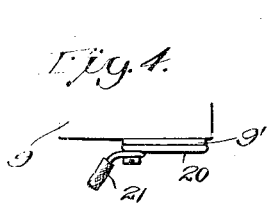
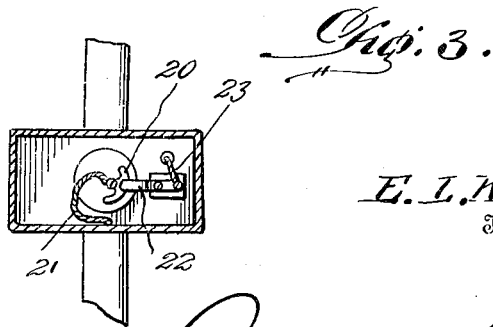
E. L. King,
Inventor Patented Apr. 7, 1925.

1,532,501

UNITED STATES PATENT OFFICE.

EDWARD L. KING, OF FONDA, IOWA.

DIRECTION INDICATOR FOR MOTOR VEHICLES.

Application filed February 18, 1924. Serial No. 693,624.

*To all whom it may concern:*

Be it known that I, EDWARD L. KING, a citizen of the United States, residing at Fonda, in the county of Pocahontas and State of Iowa, have invented certain new and useful Improvements in Direction Indicators for Motor Vehicles, of which the following is a specification.

This invention relates to direction indicators for motor vehicles and has more specific reference to an arm member, that is preferably pivotally disposed upon the windshield frame and operatively connected to the brake pedal of the vehicle whereby when said brake pedal is depressed, said arm will be swung upwardly to a horizontal position to indicate to motorists rearwardly of the vehicle upon which the signal is mounted, that the driver of this particular vehicle intends to make a left hand turn or bring his machine to a stop.

The primary object of the present invention resides in the provision of a signal of the above character, wherein the same may be readily disposed upon the windshield frame of the vehicle and in an easy manner operatively connected to the brake pedal of the vehicle, wherein when said brake pedal is slightly depressed, said arm will be extended to a relatively horizontal position for purposes above set forth.

An additional object is to provide a signal for vehicles, wherein, simultaneously with the raising of said signal arm, an electric circuit is completed to an electric lamp carried by said arm for allowing the same to be readily viewed at night time.

With the foregoing and other objects in view as the nature of the invention will be better understood, the same comprises the novel form, combination and arrangement of parts hereinafter more fully described, shown in the accompanying drawings and claimed.

In the drawing, wherein like reference characters indicate corresponding parts throughout the several views:

Figure 1 is a fragmentary detail sectional view of a motor vehicle equipped with my improved signal, said signal arm being shown in both full and dotted line positions to represent respectively said arm in its inoperative and operative positions.

Figure 2 is an enlarged detail sectional view through the windshield frame mounting means of said signal arm, and Figure 3 is a vertical longitudinal sectional view, taken substantially upon the line 3—3 of Figure 2, for more clearly disclosing the automatically operated switch member comprising an essential part of the present invention.

Figure 4 is a detail plan view, similar to Figure 2, showing the end portion of the extension, on the clamp member, and illustrating the manner of mounting the contact thereon.

Figure 5 is a diagrammatic wiring view showing the electrical connection of the lamp and switch member, in circuit with a source of energy.

Now having particular reference to the drawing, the motor vehicle fragmentarily shown is designated A, the left hand windshield frame bar 5, the vehicle floor board 6, and the brake pedal 7.

My invention per se embodies the provision of a form of clamp preferably of the two part type designated by the reference character 8. The innermost member of this clamp 8 is formed with a flanged extension 9 that engages within an opening in the front wall, of a substantially rectangular shaped sheet metal box or casing 10 that is adapted for free rotation upon said flanged extension 9 of said clamp member.

Extending through and journalled within aligned openings in the opposite end walls of said box or casing 10 is a hollow arm 11 in the form of a length of piping. The left hand end of this arm 11 extends considerably beyond said box or casing 10 and is formed at this extreme end with a circular shaped lamp casing 12 within which is disposed an electric lamp 13 that is in normally open circuit with a source of electric supply, preferably the storage battery of the vehicle, not shown, through the medium of an automatic switch disposed within said battery casing to be hereinafter more fully described. The inner end of this arm 11 is formed with a crank portion 14, the end of which is operatively connected to the shank of the foot pedal 7 in such a manner that when said foot pedal is depressed, the arm 11 will be given a one-quarter revolution within the box or casing 10, and the same extended to the horizontal dotted line position as in Figure 1. This form of connection between said end of the crank portion 14 and said brake pedal shank is in the nature of a cable 15 that extends downwardly through an opening in the floor board 6 of the vehicle and thence is passed over a guide pulley 17 secured to the under side of said floor board. This cable is then passed upwardly and connected as at 18 to the shank of said brake pedal 7.

The indicating arm 11 formed at its outer end with the lamp casing 12 normally assumes the full line position of Figure 1, so as to be inoperative when the foot pedal is released by its own weight, and the arm is returned to its position with respect to the box or casing 10 or to the full line position of Figure 2 through the medium of a coil spring 19 that is secured at one end to said arm and at its opposite end to the adjacent end wall of the box or casing 10. It will therefore be obvious that a pull on said cable 15 will rotate the arm 11 and consequently unwind upon the spring 19. A release of the foot pedal occasions a rewinding of the spring and the obvious reversal of rotation of said arm 11 within the box or casing 10.

Within the box or casing 10, the flange of the clamp section extension 9 is provided with an arcuate shaped contact plate 20 suitably insulated from said extension by an insulating plate 9', said contact plate having electrical connection, as at 21 with one terminal of the lamp 13, while the other terminal of the lamp is grounded and has connection at the storage battery through the grounded terminal thereof. Upon the adjacent rear wall of said box or casing 10 is a contact spring 22 that also has electrical connection by a wire 23 with the other post of said storage battery, and it will be obvious that as the signal arm and box 10 is moved to the dotted line position of Figure 1, said contacts 22 and 20 will become engaged for thereby completing the circuit to the lamp 13 within the lamp casing 12 of the signal arm.

The specific operation, together with numerous advantages of a vehicle signal of this character will be at once appreciated by those skilled in the art, and even though I have herein described and set forth the most practical embodiment of this invention with which I am at this time familiar, it will nevertheless be understood that minor changes may be made within the invention without departing from the spirit and scope of the appended claim.

Having thus described my invention, what I claim as new and desire to secure by Letters Patent is:

A direction indicator comprising a clamp member, a casing pivotally mounted on an extension on one end of said clamp member, an arm journalled in the casing, and having its axis disposed at a right angle to the axis of pivotal movement of the casing, said arm having a crank portion disposed exteriorly of the casing, a spring housed within the casing and connected at one end with the arm and at its other end with the casing, a contact member mounted in the casing and a contact plate mounted upon said portion on the clamp member insulated therefrom and disposed in the path of movement of the contact member which is mounted in the casing for engagement with said first mentioned contact member.

In testimony whereof I affix my signature.

EDWARD L. KING